(12) United States Patent
Brombach et al.

(10) Patent No.: US 11,511,639 B2
(45) Date of Patent: *Nov. 29, 2022

(54) CHARGING STATION WITH DYNAMIC CHARGING CURRENT DISTRIBUTION

(71) Applicant: Wobben Properties GmbH, Aurich (DE)

(72) Inventors: Johannes Brombach, Berlin (DE); Christian Strafiel, Aurich (DE); Stefan Gertjegerdes, Aurich (DE)

(73) Assignee: Wobben Properties GmbH, Aurich (DE)

( * ) Notice: Subject to any disclaimer, the term of this patent is extended or adjusted under 35 U.S.C. 154(b) by 13 days.

This patent is subject to a terminal disclaimer.

(21) Appl. No.: 16/633,914

(22) PCT Filed: Jul. 24, 2018

(86) PCT No.: PCT/EP2018/069986
§ 371 (c)(1),
(2) Date: Jan. 24, 2020

(87) PCT Pub. No.: WO2019/020600
PCT Pub. Date: Jan. 31, 2019

(65) Prior Publication Data
US 2021/0101500 A1    Apr. 8, 2021

(30) Foreign Application Priority Data

Jul. 26, 2017   (DE) .................... 10 2017 116 886.9

(51) Int. Cl.
*B60L 53/31* (2019.01)
*H02J 7/00* (2006.01)
(Continued)

(52) U.S. Cl.
CPC ............. *B60L 53/31* (2019.02); *B60L 53/10* (2019.02); *B60L 53/11* (2019.02); *B60L 53/16* (2019.02);
(Continued)

(58) Field of Classification Search
CPC .......... B60L 53/31; B60L 53/11; B60L 53/10; B60L 53/60; B60L 53/16; B60L 53/67;
(Continued)

(56) References Cited

U.S. PATENT DOCUMENTS

| 5,926,004 A | 7/1999 | Henze |
| 9,065,356 B2 | 6/2015 | Funato et al. |

(Continued)

FOREIGN PATENT DOCUMENTS

| CN | 101483350 A | 7/2009 |
| CN | 104810894 A | 7/2015 |

(Continued)

*Primary Examiner* — Richard Isla
*Assistant Examiner* — Manuel Hernandez
(74) *Attorney, Agent, or Firm* — Seed Intellectual Property Law Group LLP

(57) ABSTRACT

A charging station for charging a plurality of electric vehicles, in particular electric cars, comprising: a supply device, in particular for connecting to an electricity supply grid, for supplying the charging station with electric power, a plurality of charging terminals each for charging at least one electric vehicle, and each charging terminal comprises a supply input for drawing electric power from the supply device, a charging output having one or more charging terminals each for outputting a charging current for respectively charging a connected electric vehicle, and at least one DC current controller, arranged between the supply input and the charging output, for generating a respective controlled current from the electric power from the supply device, wherein each charging current (IL1, IL2) is formed (Continued)

from a controlled current or from a plurality of controlled currents (IS1, IS2, IS3), and wherein the charging terminals are connected to one another at exchange terminals by way of electrical exchange lines in order to exchange controlled currents with one another by way of said exchange lines.

12 Claims, 3 Drawing Sheets

(51) Int. Cl.
    *H02J 1/10*           (2006.01)
    *B60L 53/67*          (2019.01)
    *B60L 53/62*          (2019.01)
    *B60L 53/16*          (2019.01)
    *H02J 7/04*           (2006.01)
    *B60L 53/10*          (2019.01)
    *B60L 53/60*          (2019.01)

(52) U.S. Cl.
    CPC .............. *B60L 53/60* (2019.02); *B60L 53/62* (2019.02); *B60L 53/67* (2019.02); *H02J 1/102* (2013.01); *H02J 7/0013* (2013.01); *H02J 7/04* (2013.01); *H02J 2207/20* (2020.01)

(58) Field of Classification Search
    CPC . B60L 53/62; H02J 7/0013; H02J 7/04; H02J 1/102; H02J 2207/20
    USPC ........................................................ 320/109
    See application file for complete search history.

(56) References Cited

U.S. PATENT DOCUMENTS

| | | | |
|---|---|---|---|
| 9,209,638 B2 | 12/2015 | Bouman | |
| 9,371,008 B2* | 6/2016 | Bouman | B60L 53/305 |
| 9,493,082 B1* | 11/2016 | Tse | B60L 53/63 |
| 9,555,715 B2 | 1/2017 | Sugano | |
| 10,093,193 B2 | 10/2018 | Ohkuma et al. | |
| 10,759,293 B2 | 9/2020 | Heyne et al. | |
| 10,800,271 B2 | 10/2020 | Vienken et al. | |
| 10,933,764 B2 | 3/2021 | Heyne et al. | |
| 10,974,612 B2 | 4/2021 | Brombach et al. | |
| 2004/0130292 A1 | 7/2004 | Buchanan et al. | |
| 2010/0106631 A1 | 4/2010 | Kurayama et al. | |
| 2011/0285345 A1* | 11/2011 | Kawai | B60L 53/11 |
| | | | 320/107 |
| 2011/0291616 A1* | 12/2011 | Kim | B60L 53/16 |
| | | | 320/109 |
| 2013/0049677 A1* | 2/2013 | Bouman | B60L 11/185 |
| | | | 320/106 |
| 2013/0057209 A1 | 3/2013 | Nergaard et al. | |
| 2013/0069592 A1* | 3/2013 | Bouman | H02J 7/007 |
| | | | 320/109 |
| 2013/0103191 A1 | 4/2013 | Bouman | |
| 2014/0320083 A1 | 10/2014 | Masuda et al. | |
| 2015/0165917 A1* | 6/2015 | Robers | B60L 53/00 |
| | | | 320/109 |
| 2015/0326040 A1 | 11/2015 | Kawai et al. | |
| 2017/0240063 A1* | 8/2017 | Herke | H02J 5/00 |
| 2018/0134166 A1 | 5/2018 | Li et al. | |
| 2018/0212438 A1 | 7/2018 | Bouman | |
| 2020/0139827 A1 | 5/2020 | Koolen et al. | |
| 2021/0129701 A1* | 5/2021 | Brombach | H02J 1/102 |

FOREIGN PATENT DOCUMENTS

| | | | | |
|---|---|---|---|---|
| CN | 105449791 A | 3/2016 | | |
| CN | 105480110 A | 4/2016 | | |
| CN | 106564399 A | 4/2017 | | |
| DE | 102011079430 A1 | 1/2013 | | |
| DE | 102012218738 A1 | 4/2014 | | |
| EP | 2110923 | 10/2009 | | |
| EP | 2388884 A2 | 11/2011 | | |
| EP | 2784899 A1 | 10/2014 | | |
| EP | 2751902 B1 | 9/2017 | | |
| EP | 3321122 A2 | 5/2018 | | |
| JP | H05-276673 A | 10/1993 | | |
| JP | H05276673 A | * 10/1993 | | B60L 53/14 |
| JP | 2007535282 A | 11/2007 | | |
| JP | 2007323843 A | 12/2007 | | |
| JP | 2008199752 A | 8/2008 | | |
| JP | 2012-210039 A | 10/2012 | | |
| JP | 2013-027236 A | 2/2013 | | |
| JP | 2013192310 A | 9/2013 | | |
| JP | 2015109790 A | 6/2015 | | |
| JP | 2017118768 A | 6/2017 | | |
| KR | 20110137675 A | 12/2011 | | |
| KR | 10-1261272 B1 | 4/2013 | | |
| RU | 2520616 C1 | 6/2014 | | |
| RU | 2550109 C2 | 5/2015 | | |
| RU | 2553617 C2 | 6/2015 | | |
| WO | 2013/137501 A1 | 9/2013 | | |
| WO | WO-2013137501 A1 | * 9/2013 | | H02J 7/02 |

* cited by examiner

CHARGING STATION WITH DYNAMIC CHARGING CURRENT DISTRIBUTION

BACKGROUND

Technical Field

The present invention relates to a charging station for the charging of a plurality of electric vehicles, specifically electric cars. The present invention also relates to a method for charging a plurality of electric vehicles.

Description of the Related Art

As increasing numbers of electric vehicles are licensed for use on the roads, it must be assumed that, in future, a comprehensive extension of the infrastructure for the charging of electric vehicles will be required. A particular requirement for a charging infrastructure is that it should be capable of charging electric vehicles in the shortest possible time. Specifically in locations where there is substantial electric vehicle traffic, a particularly high demand for rapid charging systems can be anticipated. Examples of locations of this type are motorway service stations or central zones of cities, in which prolonged parking times of electric vehicles are not desirable.

The design or layout of a charging station poses technological challenges, which must be met. One problem in the operation of a charging station for the charging of electric vehicles, for example, is that different vehicle types which are to be connected to the charging columns or charging terminals of the charging station feature widely varying requirements with respect to charging current and charging voltages. In some vehicle types, for example, a very high charging current can be required for rapid charging, although the charging current also falls rapidly thereafter. In other vehicle types, conversely, a relatively constant current is required over a longer period. As charging terminals are generally designed to be capable of charging all types of vehicles, the capacity utilization of a charging column, on average, will only be relatively low. In practice, a charging terminal will not invariably deliver its maximum charging current to an electric vehicle, as this current is not required, or is only intermittently required by said electric vehicle.

The German Patent and Trademark Office, in the priority application pertaining to the present application, has investigated the following prior art: WO 2013/137501 A1, JP H05-276673 A, US 2010/0106631 A1, US 2014/0320083 A1 and US 2013/0057209 A1.

BRIEF SUMMARY

Provided are a method and a charging station, which at least permits an improved capacity utilization of the charging terminals of the charging station.

A charging station is designed for the charging of a plurality of electric vehicles, specifically electric cars.

The charging station thus comprises a supply device, specifically for connecting to an electricity supply grid, in order to supply the charging station with electric power. The charging station thus draws electric power or electrical energy from the electricity supply grid, which is then delivered to the charging terminal. To this end, the supply device can be connected to an electricity supply grid, specifically via a transformer. Moreover, a rectifier can be provided in the supply device, for the rectification of the alternating current which is drawn from the electricity supply grid and the delivery thereof to the charging terminal. The supply device can also comprise an energy store, specifically a battery, for the buffering of electrical energy.

In addition to the supply device, the charging station further comprises a plurality of charging terminals. The charging terminals, which can also be specifically configured as charging columns, are stationary terminals to which—in a similar manner to the fuel pumps of a conventional service station—electric vehicles can be connected by means of a charging cable, for the purposes of charging. Additionally, it is preferably provided that a plurality of electric vehicles can be connected to a charging terminal. This connection can also be executed simultaneously. According to one form of embodiment, two electric vehicles can be simultaneously connected to the same charging terminal, for the purposes of charging.

Each charging terminal comprises a supply input, which can also be synonymously described as a supply input region, for the take-up of electric power from the supply device. This can be executed directly or indirectly. Each charging terminal is thus electrically coupled to the supply device, and draws electric power delivered by the supply device at the supply input.

In addition to the supply input, each charging terminal further comprises a charging output, which can also be synonymously described as a charging output region, having one or more charging points for the respective delivery of a charging current for the charging of one connected electric vehicle in each case. It is therefore proposed that each charging terminal comprises at least one charging point, wherein one electric vehicle respectively can be connected to each charging point. The number of charging points thus corresponds to the number of electric vehicles which are connectable to the terminal. The charging point is thus a connection point on the charging terminal to which, for example, a charging cable is connected, in order to connect an electric vehicle to the terminal. A charging cable of this type can also be considered as an element of the connection point.

As a further constituent element of the charging terminal, at least one DC current controller is proposed, which is arranged between the supply input and the charging output of the charging terminal, in order to generate a controlled current from the electric power of the supply device in each case, and also to control the latter. The DC current controller, in the interests of simplification, can also be synonymously described as a current controller.

If, for example, two DC current controllers are present in a charging terminal, and are connected in an essentially mutually parallel arrangement between the supply input and the charging output, two controlled currents can be generated in a mutually independent manner by each DC current controller. The DC current controller converts the first DC voltage or the first direct current, which is received via the supply input and delivered by the supply device, into a second direct current which is appropriate for electric vehicles. A typical power rating of the DC current controller, which can also be described as a DC-DC converter, is 50 kW, wherein the converter can generate a controlled current of, for example, 125 A at 400 V DC, or 62.5 A at 800 V DC. These are typical values for a charging current, by means of which electric vehicles can be charged.

It is also considered and proposed that at least one DC current controller, and specifically all the DC current controllers, are internally variable, and specifically are switchable, such that their respective voltage rating can be varied according to the requirements of the vehicle which is to be charged. Specifically, it is proposed that the respective voltage thereof can be doubled or halved, with a simultaneous halving or doubling of their current output.

Each charging current, which is employed on a charging point for the charging of an electric vehicle, is thus constituted of a single controlled current or a plurality of controlled currents. If a charging terminal comprises, for example, two DC current controllers and two charging points, the charging terminal is designed to generate a superimposed charging current comprised of two controlled currents on one of the two charging points, if this is required. If, in a specific example, only one electric vehicle is connected to a charging terminal having two charging points, both DC current controllers can thus be employed for the charging of the vehicle. If, in a further example, two vehicles are simultaneously connected to the charging terminal, the vehicles can also be charged separately by means of only one controlled current, by way of a charging current, in each case. In an advantageous manner, the charging terminal thus permits the ideal capacity utilization of the internally installed DC current controllers, in combination, for the charging of an electric vehicle, by the switch-in and switch-out thereof. This is particularly useful if only electric vehicle is connected for charging, which requires a high charging current or a high charging capacity. In this case, the high charging capacity can be delivered, for example, by means of the exemplarily specified two DC current controllers.

In addition to the option for the respective employment of the controlled currents of the plurality of DC current controllers of only one charging terminal for the charging of an electric vehicle, it is provided that the charging terminals are mutually interconnected at exchange terminals by means of electrical exchange lines, in order to permit the mutual exchange of controlled currents, such that a charging current on one charging terminal can be constituted from a plurality of controlled currents of a plurality of charging terminals.

It has been observed that different vehicle types show highly varying requirements with respect to charging currents and charging voltages. For example, in the case of rapid charging, the charging current falls very rapidly with time. The capacity utilization of a single charging column which is designed, for example, for rapid charging of this type, on average, will be very low as a result. In a simple example, an electric vehicle has a charging current demand equal to two controlled currents. After a short time, however, this current demand reduces, such that only one controlled current is required for charging purposes, as the vehicle, for example, is already 80% charged. The charging column which has delivered such a second controlled current, the delivery of which is no longer required, can then make said current available elsewhere. Its unused controlled current can be made available on another charging terminal, via the exchange lines, or a charging current can be delivered on its own charging output.

For the more effective capacity utilization of charging terminals, a solution is thus proposed which permits the dynamic mutual exchange of controlled currents via exchange lines on the charging side of the terminals, depending upon the power or current requirements of vehicles. An electric vehicle can thus also obtain a controlled current from an adjoining charging terminal, even where, for example, no vehicle is connected to said adjoining terminal. The charging station thus makes it possible for the charging current employed for the charging of electric vehicles to be obtained directly from adjoining charging terminals or, if a higher charging current is not required for the charging of an electric vehicle, for controlled currents to be made available to another charging terminal. Not only can the variable distribution of available power be achieved, it is also possible, even by means of smaller or moderately-sized DC current controllers, to execute the variable charging of an electric vehicle which requires a charging current which is significantly higher than that which can be delivered by any individual DC current controller. Costs for DC current controllers can be saved accordingly.

A particular feature of this variability is that it is achieved locally in the charging terminals. It should be observed that, by the combination of a plurality of controlled currents to constitute a high charging current, lines of a corresponding design rating are also required, which are capable of conducting such high currents. At current strengths of several 100 A, the demands placed upon such lines are high. However, high currents of this type are only required for specific vehicles, and then only for a short duration. Nevertheless, any lines which, in principle, might conceivably be called upon to transmit high currents of this type must also be rated for currents of this magnitude. Accordingly, for the majority of the time, most lines are substantially over-engineered. By the solution according to the invention, it is achieved that this is only necessary in the region of the charging terminals. To this end, lines can be configured, for example, in the form of conductor rails between the charging stations. Specifically, as a result, over-engineered lines between the supply device and the charging terminals can be omitted.

This is achieved by the execution of flexible interconnections, particularly in the region of the charging terminals. The avoidance of over-dimensioned or over-engineered lines, specifically between the supply device and the charging terminals, is achieved accordingly. To this end, flexible interconnection is executed, in order to permit the constitution of demand-related controlled currents, i.e., by the combination thereof, in the region of the charging terminals.

Preferably, it is proposed that the charging station comprises at least one auxiliary current terminal for the generation of one or more auxiliary controlled currents, which are then delivered to at least one charging terminal. The auxiliary current terminal itself comprises no charging output. To this end, each auxiliary current terminal comprises a supply input, corresponding to the supply input of a charging terminal, for the take-up of electric power from the supply device, at least one exchange terminal, corresponding to the exchange terminal of a charging terminal, for the transmission of controlled currents to at least one of the charging terminals, and at least one DC current controller arranged between the supply input and the at least one exchange terminal, corresponding to the DC current controller of the charging terminal. These terminals are provided in order to permit the generation of a respective controlled current from the electric power of the supply device wherein, specifically, the DC current controller of the auxiliary current terminal is connected to all the exchange terminals of the auxiliary current terminal, in order to permit the delivery of controlled current to all the exchange lines.

By contrast with the charging terminal, the auxiliary current terminal is thus only employed for the delivery of auxiliary controlled currents to the charging terminals. If, for example, the power of a charging terminal is not sufficient to meet the current demand of an electric vehicle, the auxiliary current terminal can deliver one or more auxiliary controlled currents. The auxiliary current terminal, at the exchange terminals, is thus electrically connected to adjoining charging terminals via the exchange lines. Accordingly, the auxiliary current terminal delivers an auxiliary controlled current or controlled currents, if required. To this end, the auxiliary current terminal is dimensioned correspondingly to the charging terminals, such that DC current controllers of identical design can be employed in the auxiliary current terminal.

In a further form of embodiment, the charging station comprises at least one supply terminal for the reception of electric power from the supply device and the relaying thereof to the charging terminals. Each supply terminal comprises a main supply input, which is connected to the supply device via a main supply line, for the take-up of power from the supply device. The supply terminal moreover comprises at least one supply output, for the relaying of power drawn from the supply device to the charging terminals and, optionally, to the at least one auxiliary current terminal, specifically for the relaying of power to all the charging terminals. To this end, exchange terminals corresponding to the exchange terminals of the charging terminals and, optionally, of the at least one auxiliary current terminal are arranged on a first and second connection region of the supply terminal, in order to connect the supply terminal, on at least one connection region, to one respectively adjoining charging terminal and/or, optionally, to a auxiliary current terminal, in order to permit the channeling of at least one controlled current through the supply terminal. The two connection regions can be arranged on the terminal as required, for example, on a right-hand and a left-hand side of the terminal, or exclusively on the reverse side of a terminal.

Accordingly, the at least one supply terminal constitutes a type of connection and power distribution terminal for the connection of the supply device to the charging terminals or the auxiliary current terminals. The charging terminals or the auxiliary current terminal can then be connected to the supply terminal.

By contrast with the charging terminal and the auxiliary current terminal, the supply terminal comprises a separate main supply input, for the take-up of power from the supply device via a main supply line. This main supply line is preferably configured as a high-capacity cable, as the full take-up of power which is to be delivered to the electric vehicles is executed via the main line. Accordingly, only the supply terminal is directly connected to the supply device. The auxiliary current terminal and the charging terminals, conversely, are indirectly connected to the supply device via the supply terminal. The supply terminal thus relays power tapped from the supply device to the terminals which are connected to the supply terminal, or distributes said power.

The supply terminal thus comprises no DC current controller.

In summary, three different terminals are proposed in a preferred form of embodiment of the charging station, namely, the charging terminal for the charging of electric vehicles, the auxiliary current terminal for the delivery of auxiliary controlled currents, and the supply terminal for the delivery of electric power from the supply device to the charging terminals and, optionally, to auxiliary current terminals.

Preferably, the charging terminals and the at least one auxiliary current terminal comprise supply inputs of identical design. Thus, in each case, two of the supply inputs can be interconnected such that, in each case, the electric supply current, or a proportion thereof, is relayed from one supply input to an adjoining supply input. Accordingly, each charging terminal and, optionally, each auxiliary current terminal can receive a supply current from an adjoining charging terminal, an auxiliary current terminal or supply terminal. A supply line can also be looped through a supply terminal.

Additionally or alternatively, the supply inputs respectively comprise connection means of identical design, specifically plug connectors. The supply inputs thus describe a section of the respective terminal, which can also be described as a region and specifically, synonymously, as an input region. This advantageously permits the interchangeable interconnection of two respective terminals which are optionally selected from the charging terminals, or the boosting current terminals, and the supply terminal. Specifically, all the mutually connectable charging terminals, auxiliary current terminals and the supply terminal are configured to a modular design. To this end, the supply terminal also incorporates appropriate exchange terminals for this purpose and, additionally or alternatively, supply inputs.

Advantageously, on the supply inputs of identical design, it is thus possible for the charging terminals and the auxiliary current terminals to be connected in circuit one after another, in a similar manner to a long bus line, such that the charging station is extendable as required. The charging station can thus be constituted in a completely modular manner from the auxiliary current terminals, the charging terminals and the supply terminal. Moreover, it is particularly advantageous that a terminal, on mutually adapted supply inputs and exchange terminals, can be rapidly replaced in the event of a defect in said terminal, or for the extension of the charging station as required.

Each charging terminal preferably comprises at least one controllable switching means. Potential controllable switching means assume different functions, wherein a distinction is drawn between interchange switching means, charging switching means and bridge switching means.

An interchange switching means is a switching means which is electrically connected in each case to an exchange terminal, in order to control the exchange of at least one controlled current with an adjoining charging terminal or an adjoining auxiliary current terminal via said interchange switching means.

A charging switching means is a switching means which is electrically connected in each case to a charging point, in order to actuate the output of a charging current on said charging point.

A bridge switching means is a switching means which is electrically connected to two DC current controllers in a charging terminal, specifically via two transverse lines, in order to control a superimposition of the controlled currents of the two DC current controllers. As a result, further controlled currents, which are routed to one of the two transverse lines from elsewhere, for example, from an adjoining charging terminal, can also be switched-in.

The controllable switching means are essentially or exclusively arranged on the charging side with respect to the charging points in the charging terminal, specifically in order to permit the dynamic distribution of controlled currents, and to permit the generation of a demand-oriented charging current on any desired charging point.

In a further form of embodiment, it is proposed that each charging terminal comprises a first and a second connection region, each having a plurality, and specifically an equal number of exchange terminals. To this end, for each exchange terminal of one of the connection regions, a longitudinal line is provided, for the electrical connection of the respective exchange terminal of one connection region with a respective exchange terminal of the other connection region. Thus, in the event of m exchange terminals of one connection region, m longitudinal lines are provided, which are specifically electrically arranged in parallel with one another.

The first or second connection region, in a similar manner to the connection region of the supply inputs, can be arranged as required on the terminal, i.e., for example, on a right-hand and/or left-hand side, or exclusively on the reverse side of the terminal.

Moreover, a charging point is assigned to each DC current controller and, for each DC current controller, a transverse line is provided, in order to connect the DC current controller to the charging point. Thus, in the event of n DC current controllers, n transverse lines are provided.

It is further provided that each longitudinal line is directly connected to at least one of the transverse lines at a connection node. Via the latter, a controlled current, or a plurality of previously superimposed controlled currents from a further charging terminal and/or from an auxiliary current terminal can be injected into the transverse line concerned.

Additionally or alternatively, exactly n−1 bridge switching means are provided, each for the electrical connection of two transverse lines. By this arrangement, controlled currents on both transverse lines which, respectively, can also be constituted by the superimposition of a plurality of controlled currents, can be combined.

In a particular form of embodiment, it is additionally or alternatively proposed that each transverse line routed to the charging switching means comprises no further switching means. Each transverse line thus extends from its associated DC current controller to its associated charging point, and comprises a switch on its charging point, but no further switches. It has specifically been observed that a flexible interconnection of a plurality of DC current controllers, or of their transverse lines, can be achieved even in the absence of additional switching means in the transverse lines.

It is further additionally or alternatively proposed that, in each charging terminal, one longitudinal line more than the number of transverse lines is provided, such that: $m=n+1$. It has been observed that, by this arrangement, multiple charging terminals and, optionally, auxiliary current terminals can be interconnected in a highly variable manner, but with an acceptable degree of complexity, specifically such that multiple controlled currents can be exchanged between the charging terminals and, optionally, can be supplemented by controlled currents from auxiliary current terminals. By the provision of an equal number of longitudinal lines to transverse lines, each transverse line of a charging terminal can be connected to a different longitudinal line from the remaining transverse lines. The additional longitudinal line also provides the option for one or more controlled currents to be transmitted through the respective charging terminal.

It is moreover proposed, according to a further particular form of embodiment, that one longitudinal line in the charging terminal is directly connected to two transverse lines via one connection node respectively, by means of one of the bridge switching means between the two connection nodes, or to only one transverse line via one connection node, with no provision of bridge switching means in the charging terminal. The above-mentioned flexibility can thus be achieved with no great complexity.

In summary, longitudinal and transverse lines can thus be interconnected with the various controllable switching means within the charging terminal, such that this interconnected arrangement, in the manner of a matrix structure, permits the take-up or output of controlled currents from adjoining terminals, and also permits the internal utilization of all the DC current controllers of a charging terminal. However, a full matrix structure is avoided, in that switching means are only employed in a highly targeted manner, and only at specific points. The number of longitudinal lines for the overall connection of the charging terminals and, optionally, of auxiliary current terminals, is also highly limited, particularly in comparison with a complete switching matrix which, for each transverse line in the charging station, i.e., not only for each charging terminal, would comprise one longitudinal line. In the event of five charging terminals each having two DC current controllers, and thus two transverse lines each, this would give a total of 10 longitudinal lines, whereas, according to one proposed form of embodiment, only three longitudinal lines would be required for such an example.

Specifically, the above-mentioned interconnected arrangement of switching means, with longitudinal and transverse lines, permits the number of controlled currents delivered not only to be controlled by the terminal to which a vehicle is connected, but also permits adjoining terminals to be employed for the charging of an electric vehicle.

In a further form of embodiment it is proposed that, in the charging station, at least one control unit is provided, which is configured to control the charging terminals and/or the auxiliary current terminals, such that a charging current on one charging terminal can be constituted by one controlled current, or by a plurality of controlled currents. The charging current can thus be constituted, either by controlled currents from one or more DC current controllers of the same charging terminal and, additionally or alternatively, by controlled currents from one or more DC current controllers of one or more further charging terminals. A control unit of this type specifically actuates the switching means and, optionally, the DC current controllers. Coordination with the supply device is also considered, for example, for the control of access to a store, or at least for the consideration of the content of a store.

In a particular form of embodiment, it is proposed that at least one control unit is a decentralized control unit wherein, in each case, a decentralized control unit is arranged in a charging terminal and/or in an auxiliary current terminal. It is proposed that the control unit communicates with at least one further control unit, in order to permit the coordinated control of the generation of charging currents. The employment of decentralized control units provides an advantage, in that the latter can also be coupled, in a simple manner, to input units on each charging station.

Moreover, in a further particular form of embodiment, it is proposed that at least one control unit is a superordinate central control unit, wherein the central control unit is configured to execute the direct control of the charging terminals and/or the auxiliary current terminals. Additionally or alternatively, the central control unit can control the charging terminals and/or the auxiliary current terminals indirectly via the decentralized control units which are arranged in the charging terminals, in order to coordinate the generation of charging currents. Specifically, by means of central, superordinate control, overall coordination of all the charging terminals can be effectively achieved. It is preferably provided that, in the event of the failure of superordinate control, each charging terminal can at least deliver a basic actuating capacity on a DC current controller, by way of a fall-back option. It is preferably provided that each charging terminal is capable, in the event of the failure of superordinate control, of independently generating at least one charging current from one, a plurality, or all the controlled currents of the charging terminal.

The charging station is preferably configured such that the latter, specifically by means of a, or the at least one control unit, is actuatable such that at least one interchange switching means of a charging terminal, to which an electric vehicle which is to be charged is connected, can be closed such that, as a result, at least one controlled current is drawn from at least one adjoining charging terminal, and a charging current is thus generated for the electric vehicle which is to be charged.

In a particular form of embodiment, the charging station is additionally or alternatively configured such that at least one bridge switching means of the charging terminal to which the electric vehicle is connected can be closed such that, as a result, a plurality of controlled currents from a plurality of DC current controllers which are arranged in the charging terminal can be combined for the generation of the charging current.

Moreover, in a further particular form of embodiment, additionally or alternatively, at least one interchange switching means of at least one adjoining or further charging terminal and/or adjoining or further auxiliary current terminal can be closed by the control unit, such that at least one controlled current from adjoining or further charging terminals or auxiliary current terminals can be drawn and combined for the generation of the charging current.

It is further proposed that at least one bridge switching means of at least one adjoining or further charging terminal can be closed, in order to draw at least one controlled current from the plurality of DC current controllers arranged in the adjoining charging terminal for the generation of the charging current, via at least one exchange line.

Various options are thus provided for the achievement of the variable distribution or assignment of controlled currents. This is specifically achieved by the switching of switching means. It is specifically preferred that all the switching operations described are coordinated within an overall concept. This specifically coordinates the switching of the three switch types, namely, the interchange switching means, the charging switching means and the bridge switching means.

The control unit is also specifically designed to control the controllable switching means which are arranged within a charging terminal, by means of a control signal. To this end, the control unit can actuate the switching means via a customary control link, for example, directly via a customary control link, or by means of another communication system.

It is preferably proposed that at least one interchange switching means and at least one bridge switching means are interconnected such that a controlled current from one DC current controller of a first charging terminal or a first auxiliary current terminal can flow via a first longitudinal line and the at least one interchange switching means into a second charging terminal. Additionally, the controlled current in the second charging terminal can flow via a first connection node and a first transverse line to a second longitudinal line. Moreover, the controlled current can also flow via a second connection node, the at least one bridge switching means and a third connection node to a second transverse line of the second charging terminal.

These specific interconnection variants thus permit the interchange switching means and the at least one bridge switching means to be interconnected, such that at least one further controlled current can be combined for the generation of a charging current, specifically for the charging of an electric vehicle which is connected to the second transverse line.

The charging station is preferably designed such that the latter, specifically by means of a or the at least one control unit, can be actuated, wherein the controllable switching means can be switched such that a charging current can be combined from at least three controlled currents, preferably at least five controlled currents, and specifically at least seven controlled currents, or constituted from the latter.

A particular advantage of the generation of a charging current from a plurality of controlled currents is that no or fewer heavy-duty DC current controllers are required for the coverage of any current demand which is potentially greater than that which can be generated by a customary DC current controller. For example, an electric vehicle which requires a charging current of 400 A might then be charged by four controlled currents of respective rating 100 A, rather than necessitating the use of a single heavy-duty current controller with a rating of 400 A. Moreover, the number of controlled currents employed can rapidly be reduced from four back to three, remaining with the same example, if the demand for a high charging current reduces. The DC current controller thus released can then deliver a controlled current for another charging process.

In a further form of embodiment, it is proposed that the control unit can control the generation of charging currents, and specifically the number of controlled currents delivered to a charging point, in accordance with a control criterion. Different control criteria are possible, wherein the following are specifically proposed:

- a type of electric vehicle connected to the charging point;
- a storage state of the electric vehicle connected to the charging point;
- a storage state-dependent current demand of the connected electric vehicle;
- a current demand of the connected electric vehicle;
- a charging instruction issued by the user for the charging of an electric vehicle which is connected to the charging point;
- a number of available DC current controllers for the generation of controlled currents to be combined for the generation of a charging current.

A significant advantage over conventional charging stations is thus that unused controlled currents, or the controlled currents of temporarily unused DC current controllers, depending upon the above-mentioned control criteria, can be made available to other electric vehicles on adjoining charging terminals. Moreover, the simple commutation of unused DC current controllers is likewise possible, in the event of the prolonged stoppage of vehicles, which are already fully-charged, at a charging terminal.

A method is further proposed for the charging of a plurality of electric vehicles, specifically electric cars, by means of a charging station, wherein the method comprises the following steps:

- supply of the charging station with electric power by means of a supply device of the charging station;
- the charging of at least one electric vehicle respectively by means of one of a plurality of charging terminals of the charging station, by the following steps:
  - the take-up of electric power from the supply device at one supply input of the charging terminal,
  - the output of one charging current respectively for the charging of the connected electric vehicle at a charging output having one or more charging points, wherein the electric vehicle is connected to one of the charging points at which an output of charging current is delivered, and wherein at least one DC current controller arranged between the supply input and the charging output generates a respective controlled current from the electric power of the supply device, and the charging current is constituted from one controlled current or a plurality of controlled currents, and wherein the charging terminals are mutually interconnected at exchange terminals, via electric exchange lines, and optionally execute the mutual exchange of controlled currents by means thereof.

A method is thus proposed which, in an advantageous manner, employs a charging station according to at least one of the above-mentioned forms of embodiment for the charging of at least one electric vehicle. The method can thus implement and/or exploit the above-mentioned advantages and properties assigned to the charging station.

Preferably, it is thus further proposed that the method employs a charging station according to an above-mentioned form of embodiment.

According to a further form of embodiment, it is proposed that at least one interchange switching means of a charging terminal, to which an electric vehicle which is to be charged is connected, is closed and, as a result, at least one controlled current is drawn from at least one adjoining charging terminal, such that a charging current is generated for the electric vehicle which is to be charged, and/or at least one bridge switching means of the charging terminal to which the electric vehicle is connected is closed and, as a result, a plurality of controlled currents from a plurality of DC current controllers arranged in the charging terminal are combined or superimposed for the generation of the charging current, and/or at least one interchange switching means of at least one adjoining or further charging terminal, and/or of adjoining or further auxiliary current terminals is closed and, as a result, at least one controlled current is drawn from adjoining or further charging terminals or auxiliary current terminals for the generation of the charging current, and is combined or superimposed, and/or at least one bridge switching means of at least one adjoining or further charging terminal is closed and, as a result, at least one controlled current from the plurality of DC current controllers arranged in the adjoining charging terminal is drawn for the generation of the charging current via at least one exchange line.

These process steps also permit the achievement or exploitation of the aforementioned characteristics and properties described with respect to the charging station. Particularly advantageously, the four above-mentioned characteristics are combined such that, in an advantageous manner, charging currents are constituted from a plurality of controlled currents.

BRIEF DESCRIPTION OF THE SEVERAL VIEWS OF THE DRAWINGS

The present invention is described in greater detail hereinafter, in an exemplary manner, with respect to exemplary embodiments and with reference to the accompanying figures.

DETAILED DESCRIPTION

Figure 1:
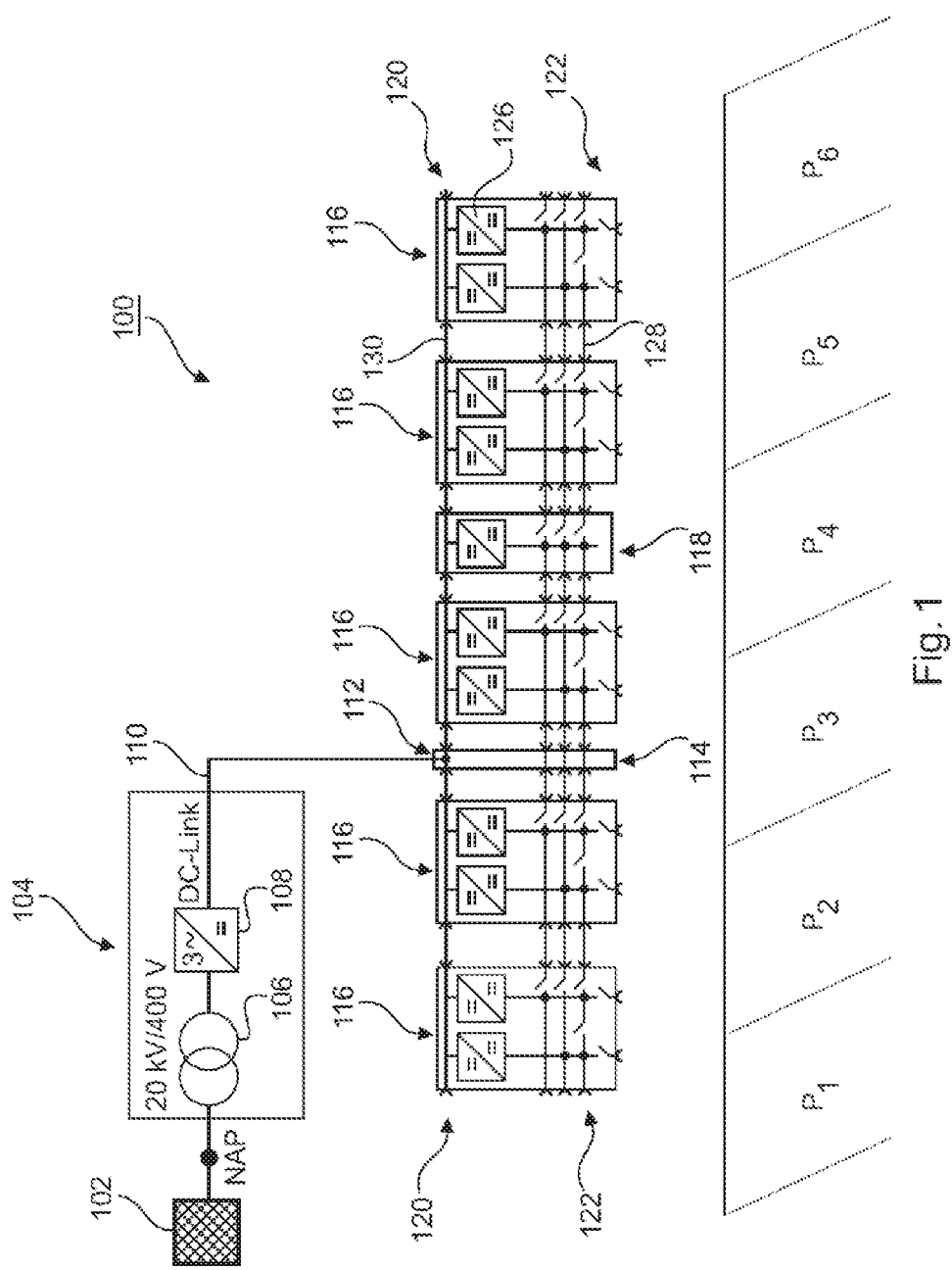
FIG. 1 shows an exemplary form of a charging station.

FIG. 1 shows a charging station 100, which is connected to an electricity supply grid 102 via a grid connection point NAP. In order to permit a take-up of power from the supply grid 102 for the charging of electric vehicles, a supply device 104 is provided. The supply device 104 comprises at least one transformer 106 and a rectifier unit 108 arranged downcircuit of the transformer. The transformer 106 is directly connected to the supply grid 102 via the grid connection point NAP, and transforms a first AC voltage, specifically the grid voltage, into a second AC voltage which is appropriate for the rectifier unit 108. By way of a specific example, a medium-voltage transformer is represented in FIG. 1, which steps down the grid voltage of 20 kV to an AC voltage of 400 V. From the second AC voltage, the rectifier unit 108 represented generates a DC voltage on a DC output, and thus delivers power which is drawn from the supply grid. Accordingly, the supply device 104 is specifically provided for connection to an electricity supply grid 102, and for the supply of electric power to the charging station.

The charging station 100 represented in FIG. 1 further comprises five charging terminals 116, a supply terminal 114 and a auxiliary current terminal 118 which, in the interests of simplification, can also be described as terminals. A detailed description of the above-mentioned terminals follows in the description of FIG. 2.

In one specific example, the terminals (114, 116, 118) of the charging station 100 are arranged next to one another on the parking spaces P1 to P6. Accordingly, a plurality of electric vehicles can be charged, which are parked on the parking spaces P1-P6 for the purposes of charging. The parking spaces are specifically to be understood as illustrative, wherein the number of vehicles to be charged is not limited to six but, instead, up to ten vehicles can, in principle, be charged in the charging station illustrated.

A supply terminal 114 is provided, in order to relay the power delivered by the supply device 104 to the terminals in the form of a DC voltage. To this end, the supply terminal is electrically connected to the rectifier unit 108 via a main supply line 110. In order to constitute the electrical connection with the main supply line 110, a main supply input 112 is provided on the supply terminal 114. Via the main supply input 112, power can thus be drawn from the supply device 104. The power thus drawn is then distributed via a plurality of supply lines 130 to the other terminals (116, 118). The supply terminal 114 is thus configured for the reception of electric power from the supply device and the relaying thereof to the charging terminals 116 and, optionally, to the auxiliary current terminal 118.

In addition to the supply terminal, the charging station 100 comprises a plurality of charging terminals 116 for the charging of at least one electric vehicle respectively.

Each charging terminal comprises a supply input 120 and a charging output 122. The supply input 120 is configured for the take-up of electric power from the supply device 104, wherein connection points are provided on the supply input 120, by means of which the terminals can be mutually connected at the supply inputs. FIG. 1 shows that, for example, two charging terminals 116 are arranged on the left-hand side, and three charging terminals, together with the auxiliary current terminal 118, on the right-hand side, in relation to the supply terminal 114. All the terminals are mutually electrically coupled on the respective supply inputs 120 by means of supply lines 130. In the example represented, one section of the supply line 130 is thus present in each case between two adjoining terminals, such that no long and continuous supply line is present, as is customarily the case in a current busbar or bus conductor. Via the supply lines 130, the charging terminals can execute the direct take-up of electric power which is relayed by the supply terminal 114. Depending upon the layout of the terminals in the charging station, however, the charging terminals 116 and auxiliary current terminals 118 can also execute the indirect take-up of power relayed from the supply terminal 114 via another terminal. In this case, the supply inputs can then also be considered as supply outputs for an adjoining terminal.

Figure 2:
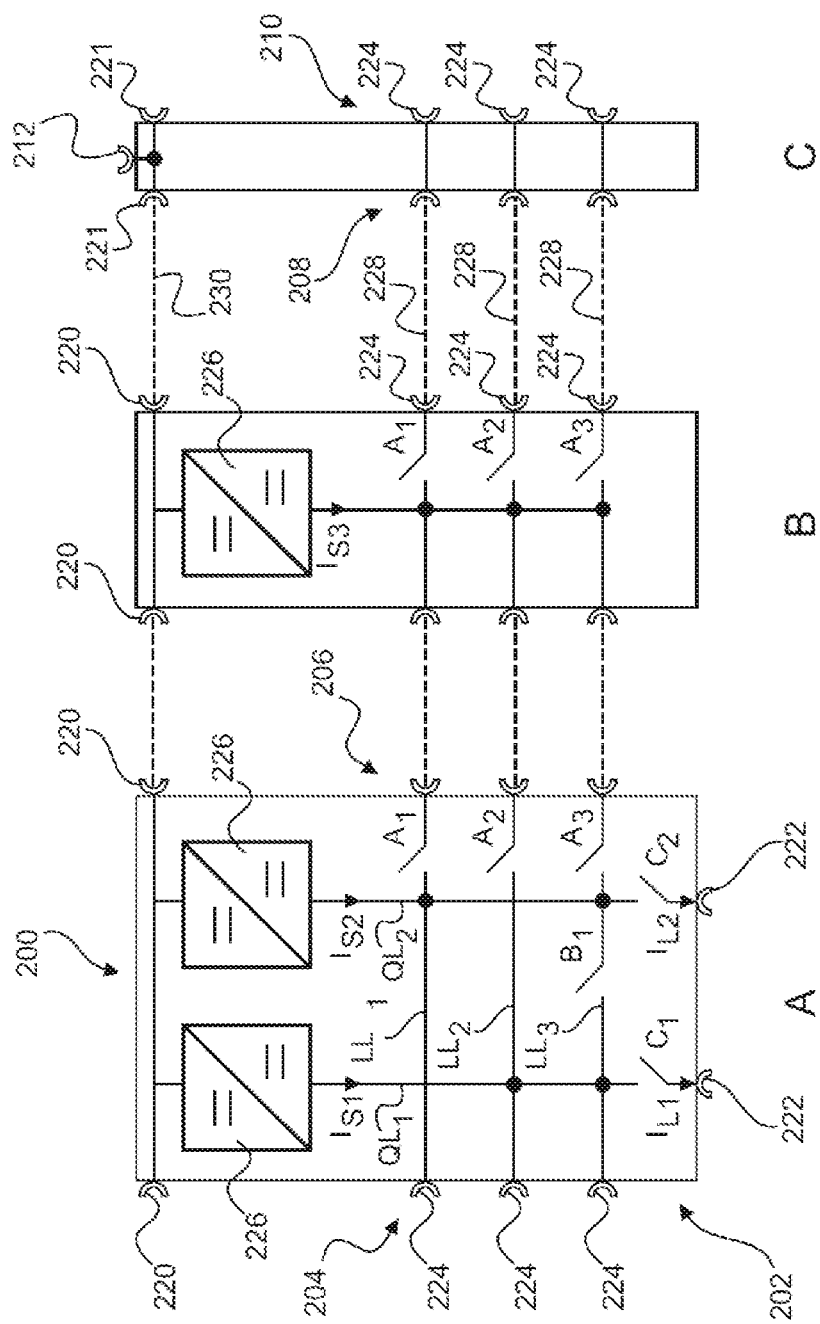
FIG. 2 shows a detailed form of embodiment of a charging terminal, a auxiliary current terminal and a supply terminal.

In addition to the supply input 120, a charging output 122 having one or more charging points is further provided on each charging terminal 116, which are employed in each case for the output of a charging current for the charging of a respectively connected electric vehicle. In FIG. 2, for example, two electric vehicles can be connected in each case to the two charging outputs of one of the five charging terminals 116.

Between the supply input 120 and the charging output 122, in each of the charging terminals 116, at least one DC current controller 126 is arranged, in order to generate one controlled current in each case per current controller or DC-DC converter. The currents thus generated are then employed for the charging of an electric vehicle which is connected to a charging output 122 of one of the charging terminals.

By way of a further terminal, an auxiliary current terminal is provided in the charging station. The function of this auxiliary current terminal is to generate and deliver an auxiliary current for the charging of electric vehicles. It thus comprises no charging points on a charging output for the charging of an electric vehicle. A auxiliary current is delivered, for example, in the event of excess capacity demand on a charging terminal. Excess capacity demand can occur, for example, if the current demand of an electric vehicle exceeds the maximum current which can be generated by a terminal. In one specific example, a vehicle requires a charging current of 400 A, whereas the charging terminal can only deliver a maximum of 100 A. The auxiliary current terminal is thus provided for the generation of one or more additional auxiliary currents, specifically controlled currents, which are delivered to said at least one charging terminal, wherein the auxiliary current terminal itself comprises no charging output.

Specifically, in the charging station 100 represented in FIG. 1, it will be seen that the charging outputs 122 of the charging terminal are mutually connected at exchange terminals by means of electric exchange lines 128 such that, via the latter, controlled currents generated can be mutually exchanged. It is likewise provided that the supply terminal 114 and the auxiliary current terminal 118 are also electrically coupled to the charging terminals 116 on the output side via the exchange lines 128. Thus, for example, an electric vehicle which is parked on the parking space P1 can draw a charging current which has been at least partially generated by a DC current controller on another charging terminal or an auxiliary current terminal.

FIG. 2 shows a detailed form of embodiment of a charging terminal A, a auxiliary current terminal B and a supply terminal C, which correspond to the charging terminal 116, the auxiliary current terminal 118 or the supply terminal 114 in FIG. 1.

The charging terminal A comprises a supply input 200 and a charging output 202. On the supply input 200, two connection means 220 are arranged, which can be configured, for example, as plug connectors. On these connection means, any further charging terminal, an auxiliary current terminal or a supply terminal can thus be connected, in order to mutually connect the supply inputs of said terminals.

Each charging terminal A comprises two DC current controllers 226, which are configured in a mutually parallel arrangement between the supply input 200 and the charging output 202, each of which injects a controlled current $I_{S1}$ or $I_{S2}$ into a respective transverse line $QL_1$ and $QL_2$ arranged on the charging output. Exactly one charging point 222 is assigned to each DC current controller 226 and, for each DC current controller, a transverse line $QL_1$ or $QL_2$ is assigned. Thus, in the event of n DC current controllers, n transverse lines are employed for the connection of the respective DC current controller to the charging point. Where two DC current controllers are provided in the charging terminal A, the resulting layout of the terminal thus comprises two transverse lines $QL_1$, $QL_2$ and two charging points 222.

Additionally, for charging terminal A, a first and a second connection region are indicated by the arrows 204 and 206, each of which comprises a plurality, and specifically an equal number of exchange terminals 224. At these exchange terminals, the terminals can be connected by means of essentially parallel exchange lines 228, which are represented in FIG. 2 by broken lines.

For each exchange terminal of one of the connection regions, a longitudinal line $LL_1$, $LL_2$, $LL_3$ is moreover arranged within the terminal, in order to electrically connect the respective exchange terminal 224 of one connection region 204, 206 to a respective exchange terminal of the other connection region 206, 204, such that, in the event of m exchange terminals on one connection region, m longitudinal lines are provided. The longitudinal lines are specifically oriented in a mutually electrically parallel arrangement. To this end, for example, the specific configuration of the charging terminal A, for example, comprises three exchange terminals in the connection region 206, wherein three longitudinal lines are provided. The longitudinal lines $LL_1$, $LL_2$ and $LL_3$ connect the two connection regions 204 and 206.

In order to permit a dynamic exchange of DC controller currents generated, each longitudinal line $LL_1$, $LL_2$, $LL_3$ is directly connected respectively via a connection node to at least one of the transverse lines $QL_1$, $QL_2$.

In order to permit, moreover, the generation of charging currents $I_{L1}$ or $I_{L2}$ on any one of the charging outputs 222, a plurality of controllable switching means or switches are provided in the charging terminal, which can be actuated by a control unit. Either each charging terminal can incorporate its own control unit, or a superordinate control unit can assume the actuation of the controllable switching means. A combined arrangement of control units in each charging terminal and a superordinate control unit can also be implemented. However, this is not represented in FIG. 2.

By way of controllable switching means in the charging terminal A in FIG. 2, three interchange switching means or switches A1, A2 and A3 are represented, each of which is electrically connected to one exchange terminal 224, in order to permit the control of the exchange of at least one controlled current with an adjoining charging terminal or auxiliary current terminal via the interchange means. A further controllable switching means is the bridge switching means or switch B1, which electrically interconnects two DC current controllers in a charging terminal, in the present case via the two transverse lines QL1 and QL2, in order to control a superimposition of the controlled currents $I_{S1}$ and $I_{S2}$ of the two DC current controllers 226. A respective charging switching means or switch C1 or C2 is also arranged on a charging point 222, in order to control the output of the charging current $I_{L1}$ or $I_{L2}$.

Accordingly, the charging terminal A represented in FIG. 2 can constitute a charging current $I_{L1}$ or $I_{L2}$ from one current controller current $I_{S1}$ or $I_{S2}$, or from a plurality of controlled currents, and can even take up or deliver further controlled currents via the exchange terminals.

By contrast with the charging terminal A, in the auxiliary current terminal B, the DC current controller 226 is connected to all the exchange terminals 224, in order to deliver the controlled current $I_{S3}$ on all the exchange lines 228. The auxiliary current terminal is thus prepared for the output of an additional current. However, in order to further permit the controlled output of controlled currents, in a similar manner to the charging terminal A, three interchange switching means A1, A2 and A3 are provided in the auxiliary current terminal. These can also be employed for the relaying of controlled currents from adjoining terminals if, for example, the current controller 226 in the auxiliary current terminal generates no current $I_{S3}$.

The supply terminal C, by contrast with the terminals A and B, comprises an additional main supply input 212, together with two supply outputs 221 respectively, which are of identical design to the supply inputs of the terminals A and B. The supply outputs 221 are employed for the relaying thereby of power which is drawn from the supply device to the charging terminals and, optionally, to the at least one auxiliary current terminal, and specifically for the relaying of power to all the charging terminals.

Moreover, the supply terminal C, similarly to the terminals A and B, also comprises exchange terminals 224 for connection, on at least one connection region 208 or 210, with a respectively adjoining charging terminal and/or, optionally, with an auxiliary current terminal, in order to permit the channeling of at least one controlled current through the supply terminal.

The supply inputs/outputs and exchange terminals of the terminals A, B and C are essentially of an identical design. In the manner of a moveable type case, a charging station can thus be constituted with a modular structure, as required, from the terminals A, B and/or C.

Figure 3:
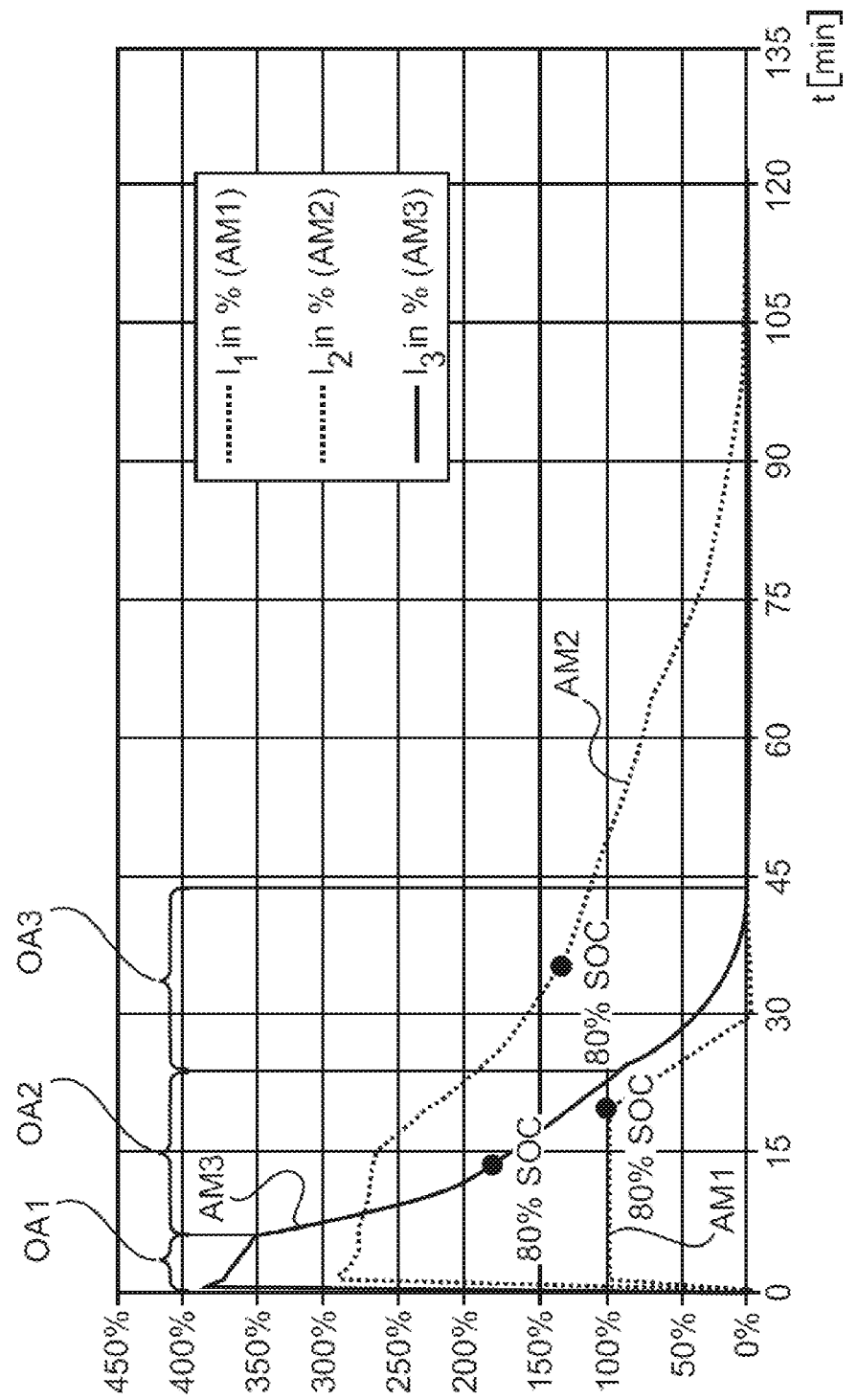
FIG. 3 shows a diagram of three different charging current characteristics for three different vehicle classes respectively.

FIG. 3 shows a diagram of three different charging current characteristics $I_1$, $I_2$ and $I_3$, in percentages, for three different vehicle classes AM1, AM2 and AM3. Capacity utilization of the charging station, in percent, is plotted on the y-axis, wherein the charging station, in the present example, with 100% capacity utilization, can deliver a charging current of 100 A, which corresponds to the maximum current for vehicle class AM1. The time t in minutes is plotted on the x-axis.

The characteristic current curves $I_1$, $I_2$ and $I_3$ show highly diverse profiles, wherein each of the three characteristic curves corresponds to a characteristic current curve for a different vehicle class AM1, AM2 or AM3. It should be observed that vehicle class AM3 requires a charging voltage which is approximately double that required by vehicle classes AM1 and AM2. The 400% charging current, which is indicated initially in FIG. 3 for vehicle class AM3, in relation to vehicle class AM1, thus corresponds to a charging capacity of approximately 800%. Additionally, 80%-SOC (state of charge) points, which indicate a state of charge of 80% in relation to a full charge, are achieved at very different time points. Vehicle class AM1 might correspond, for example, to a small car class, while vehicle class AM2 corresponds to a premium class, and class AM3 to a super sports car class. Depending upon the vehicle class or vehicle type, the characteristic charging curves or characteristic current curves $I_1$, $I_2$ and $I_3$ assume a different profile. Two current controllers can operate in parallel (at double the current) or in series (at double the voltage).

For vehicle class AM1, for example, a relatively constant charging current of 100 A is required for approximately 20 minutes, such that a charging terminal with one DC current controller is subject to 100% capacity utilization. In this case, one current controller which is capable of delivering 100 A would be sufficient. Conversely, in the case of a premium vehicle or a sports car, one charging terminal in isolation would not be capable of delivering the requisite charging current for the charging of these vehicle types. In order to avoid the necessity for the rating of a DC current controller, for example, to 400 A for a super sports car, the proposed charging terminal can execute the take-up of DC controlled currents via adjoining terminals, in order to permit the charging of a super sports car in a first charging range AO1. In charging range AO2, the current demand of the super sports car than declines relatively rapidly. DC current controllers which are not needed, depending upon the current demand of the vehicle—if no longer required—can then be released, switched off or commutated by the control unit.

Accordingly, with regard to the specific example of the super sports car, the charging station would thus be able to charge the super sports car to a capacity utilization factor of 300% within barely the first seven minutes, using seven or eight DC current controllers delivering approximately 50 A each. This high number is required on the grounds that the exemplary super sports car requires double the charging voltage such that, rather than approximately 100 A, only approximately 50 A can be delivered per DC current controller. Between 300% and 200% only six or five DC current controllers would still be required, from 200% downwards only four or three DC current controllers would still be required and, after 22.5 minutes, in working region AO3, only two or one DC current controllers are still required for the full charging of the sports car.

The invention claimed is:

1. A charging station for the charging of a plurality of electric vehicles, the charging station comprising:
    a supply device for connecting to an electricity supply grid to supply the charging station with electric power;
    a plurality of charging terminals, each for charging at least one electric vehicle, wherein each charging terminal comprises:
        a supply input configured to receive electric power from the supply device;
        a charging output having one or more charging points, each for outputting a charging current for respectively charging a connected electric vehicle; and
        at least one DC current controller arranged between the supply input and the charging output, the at least one DC current controller configured to generate a respective controlled current from the electric power,
    wherein each charging current comprises one controlled current or a plurality of controlled currents,
    wherein the charging terminals are connected to one another at exchange terminals by way of electrical exchange lines to exchange controlled currents with one another by way of the electrical exchange lines, and
    wherein each charging terminal comprises at least one controllable switch chosen from a list comprising:

an interchange switch electrically connected in each case to the exchange terminal to control the exchange of at least one controlled current with an adjoining charging terminal or an adjoining auxiliary current terminal, a charging switch electrically connected in each case to a charging point to control the output of the charging current on the charging point, and a bridge switch electrically connected to two DC current controllers in the charging terminal via two transverse lines to control a superimposition of the controlled currents of the two DC current controllers, wherein each charging terminal comprises a first connection region and a second connection region, each of the first and second connection regions having a plurality of exchange terminals, wherein for each exchange terminal of one of the first and second connection regions, a longitudinal line is provided for an electrical connection of the respective exchange terminal of one connection region with the respective exchange terminal of the other connection region, such that, in the event of m exchange terminals of one connection region, m longitudinal lines are provided, which are specifically electrically arranged in parallel with one another, wherein a charging point is assigned to each DC current controller and, for each DC current controller, a transverse line is provided to connect the DC current controller to the charging point, such that, in the event of n DC current controllers, n transverse lines are provided, wherein each longitudinal line is directly connected to at least one of the transverse lines at a connection node, wherein exactly n-1 bridge switches are provided, each for the electrical connection of two transverse lines, wherein each transverse line to the charging switch comprises no further switch, and wherein in each charging terminal, one more longitudinal line than the number of transverse lines is provided, such that: m=n+1, wherein one longitudinal line in the charging terminal is:
  directly connected to two transverse lines via one connection node respectively, by one of the bridge switches between the two connection nodes, or
  connected to only one transverse line via one connection node, wherein no bridge switch is incorporated in the charging terminal.

2. The charging station as claimed in claim 1, wherein the charging station comprises at least one auxiliary current terminal configured to generate one or more auxiliary controlled currents, wherein the one or more auxiliary controlled currents are delivered to at least one charging terminal, wherein each auxiliary current terminal comprises:

a supply input corresponding to the supply input of the charging terminal for receiving electric power from the supply device, at least one exchange terminal corresponding to the exchange terminal of the charging terminal and for the transmission of controlled currents to at least one of the charging terminals, and at least one DC current controller arranged between the supply input and the at least one exchange terminal of the auxiliary current terminal, the at least one DC current controller corresponding to the at least one DC current controller of the charging terminal to permit the generation of the respective controlled current from the electric power of the supply device, wherein the DC current controller of the at least one auxiliary current terminal is connected to all the exchange terminals of the auxiliary current terminal to permit delivery of controlled current to all the exchange lines.

3. The charging station as claimed in claim 1, wherein the charging station comprises at least one supply terminal configured to receive electric power from the supply device and to provide the electric power to the charging terminals, wherein each supply terminal comprises:

a main supply input connected to the supply device via a main supply line, wherein the main supply input is configured to receive the electric power from the supply device, at least one supply output configured to provide the electric power received from the supply device to the charging terminals, and exchange terminals corresponding to the exchange terminals of the charging terminals and of the at least one auxiliary current terminal are arranged on a first and second connection region of the supply terminal to connect at least one connection region to one respectively adjoining charging terminal to permit the channeling of at least one controlled current through the supply terminal.

4. The charging station as claimed in claim 3, wherein the at least one supply output is configured to provide the electric power received from the supply device to the at least one auxiliary current terminal, and wherein exchange terminals corresponding to the exchange terminals of the at least one auxiliary current terminal are arranged on the first and second connection regions of the supply terminal to connect to at least one connection region to the at least one auxiliary current terminal.

5. The charging station as claimed in claim 1, wherein the charging terminals:

comprise supply inputs, each of identical design such that, in each case, two of the supply inputs can be interconnected such that, in each case, the electric supply current, or a portion of the electric supply current, is relayed from one supply input to an adjoining supply input, and wherein each of at least one of the supply inputs or the exchange terminals comprise connection means of identical design for the mutually interchangeable connection of two selected charging terminals such that all the mutually connected charging terminals, in combination, are configured with a modular design.

6. The charging station as claimed in claim 5, wherein the connection means are plug connectors.

7. The charging station as claimed in claim 1, further comprising:

at least one control unit configured to control at least one of the charging terminals or the auxiliary current terminals such that the charging current on one charging terminal comprises one controlled current or the plurality of controlled currents, wherein the charging current comprises controlled currents from one or more DC current controllers of the same charging terminal or controlled currents from one or more DC current controllers of one or more further charging terminals.

8. The charging station as claimed in claim 7, wherein the charging station is actuatable by the at least one control unit, such that:

at least one interchange switch of the charging terminal, to which the electric vehicle is connected, is configured to be closed such that, as a result, at least one controlled current is drawn from at least one adjoining charging terminal, and the charging current is thus generated for the electric vehicle, at least one bridge switch of the charging terminal, to which the electric vehicle is connected, is configured to be closed such that, as a result, the plurality of controlled currents from the plurality of DC current controllers which are arranged in the charging terminal is configured to be combined for the generation of the charging current, at least one interchange switch of at least one adjoining charging terminal or adjoining auxiliary current terminals is closed and, as a result, at least one controlled current is drawn from the adjoining charging terminals or auxiliary current terminals and combined for the generation of the charging current, and at least one bridge switch of at least one adjoining or further charging terminal is configured to be closed to draw at least one controlled current from the plurality of DC current controllers arranged in the adjoining charging terminal for the generation of the charging current, via at least one exchange line.

9. The charging station as claimed in claim 1, wherein at least one interchange switch and at least one bridge switch is configured to be interconnected such that:

the controlled current from one DC current controller of a first charging terminal or a first auxiliary current terminal flows via a first longitudinal line and the at least one interchange switch into a second charging terminal, the controlled current in the second charging terminal flows via a first connection node and a first transverse line to a second longitudinal line, the controlled current flows via a second connection node, the at least one bridge switch and a third connection node to a second transverse line of the second charging terminal, wherein the controlled current is combined with at least one further controlled current for the generation of the charging current, and wherein the charging current is for the charging of an electric vehicle connected to the second transverse line.

10. The charging station as claimed in claim 1, further comprising:

at least one control unit configured to be actuated to control the controllable switch such that the charging current comprises at least three controlled currents.

11. The charging station as claimed in claim 10, wherein the control unit is configured to control the generation of charging currents including the number of controlled currents delivered to the charging point, in accordance with a control criterion, selected from the list comprising the following:

a type of electric vehicle connected to the charging point;

a storage state of the electric vehicle connected to the charging point;

a storage state-dependent current demand of the connected electric vehicle;

a current demand of the connected electric vehicle;

a charging instruction issued by a user for the charging of the electric vehicle which is connected to the charging point; and a number of available DC current controllers for the generation of controlled currents to be combined for the generation of the charging current.

12. The charging station as claimed in claim 1, wherein the plurality of electric vehicles is a plurality of electric cars.

* * * * *